United States Patent
Lin

(10) Patent No.: US 7,760,807 B2
(45) Date of Patent: Jul. 20, 2010

(54) METHOD AND SYSTEM FOR MOTION ESTIMATION USING CHROMINANCE INFORMATION

(75) Inventor: Chun-Hung Lin, Jhubei (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 1371 days.

(21) Appl. No.: 11/206,137

(22) Filed: Aug. 18, 2005

(65) Prior Publication Data

US 2006/0188018 A1    Aug. 24, 2006

(30) Foreign Application Priority Data

Feb. 22, 2005   (TW) ............................... 94105286 A

(51) Int. Cl.
H04N 7/12    (2006.01)
(52) U.S. Cl. ............. 375/240.16; 375/240; 375/240.01; 375/240.12
(58) Field of Classification Search ................. 375/240, 375/240.01, 240.12, 240.16
See application file for complete search history.

(56) References Cited

U.S. PATENT DOCUMENTS 6,996,175 B1 *   2/2006   Olivieri ................. 375/240.16

* cited by examiner

*Primary Examiner*—Allen Wong
(74) *Attorney, Agent, or Firm*—Bacon & Thomas, PLLC

(57) ABSTRACT

A method and system for motion estimation using chrominance information, which is based on each block of a current frame to find a corresponding block from a previous frame within a search area and accordingly determines a motion vector and includes first separately computing luminance differences and chrominance differences between luminance and chrominance of a target block in a current frame and luminance and chrominance of candidate blocks in a search range of a previous frame, next adjusting the luminance differences based on the first chrominance differences and the second chrominance differences and outputting adjusted luminance differences; and finally finding a minimum one among the adjusted luminance differences and accordingly determining the motion vector.

12 Claims, 7 Drawing Sheets

METHOD AND SYSTEM FOR MOTION ESTIMATION USING CHROMINANCE INFORMATION

BACKGROUND OF THE INVENTION

1. Field of the Invention

The invention relates to a method and system for motion estimation and, more particularly, to a method and system for motion estimation using chrominance information.

2. Description of Related Art

In the international video compression standards such as MPEGx H.26x, the inter-frame prediction that applies block matching to motion estimation is widely used to obtain high efficiency in motion picture data coding. FIG. 1 shows a flowchart of a typical inter-frame coding. As shown in FIG. 1, an MPEG system divides a frame into macroblocks (MBs) or sub-macroblocks wherein a macroblock is a 16×16 pixels block and sub-macroblocks can be 8×8 or 4×4 pixels block. For a previous frame (forward or backward) 11 and a current frame 12, when coding, a corresponding motion vector is found for each block 101' of the previous frame 11 at first. Accordingly, motion estimation of the previous frame 11 can obtain a prediction frame 13. A difference frame 14 is obtained by comparing the prediction frame 13 and the current frame 12. As such, only the motion vectors and the difference frame 14 are required in transmission or storage, and effective compression is obtained. For decompression, the motion vectors and the difference frame 14 are sent to an MPEG decoder, and original blocks of the current frame 12 are restored by adding blocks read from the previous frame 11 based on the motion vectors and blocks of the difference frame 14.

As shown in FIG. 2, the motion estimation is based on each block 101 of the current frame 12 to find a corresponding block 101' from the previous frame 11, thereby obtaining the motion behavior of the block 101' and thus determining a corresponding motion vector. Typically, a luminance (i.e., Y component) difference between the blocks 101' and 101 can represent a similarity degree at a comparison of the blocks 101 and 101'. As shown in FIG. 3, a typical motion estimation with the luminance first computes luminance differences $Y_1$-SAD~$Y_n$-SAD between the luminance Y of a target block and the luminance $Y_1'$~$Y_n'$ of candidate blocks corresponding to the target block. The difference computation can use a known summed absolute difference (SAD). The differences $Y_1$-SAD~$Y_n$-SAD are compared with each other to find a minimum one for accordingly finding a motion vector (MV) of the target block. Generally, such a way can reach to a satisfactory prediction. However, for some areas with low luminance, the motion estimation becomes inaccurate by means of the luminance only. Errors caused by the inaccurate motion estimation further produce error propagation caused by a subsequent processed image of predictive-coded picture, which can reduce a quality of the image frame due to over-valued quantization step-size.

To overcome this, as shown in FIG. 4, a typical method respectively computes luminance differences $Y_1$-SAD~$Y_n$-SAD between the luminance Y of target block and the luminance $Y_1'$~$Y_n'$ of candidate blocks and chrominance differences $U_1$-SAD~$U_n$-SAD, $V_1$-SAD~$V_n$-SAD between the chrominance U/V of the target block and the chrominance $U_1'$~$U_n'/V_1'$~$V_n'$ of the candidate blocks. Next, the luminance differences and the chrominance differences are summed respectively to obtain luminance and chrominance differences $YUV_1$-SAD~$YUV_n$-SAD, and accordingly a minimum one among the luminance and chrominance differences $YUV_1$-SAD~$YUV_n$-SAD can be found to thus find the motion vector. Such a method computes and compares the luminance and chrominance differences without weighting so as to reduce entire coding efficiency.

As shown in FIG. 5, another typical method respectively computes luminance differences $Y_1$-SAD~$Y_n$-SAD between the luminance Y of target block and the luminance $Y_1'$~$Y_n'$ of candidate blocks and chrominance differences $U_1$-SAD~$U_n$-SAD, $V_1$-SAD~$V_n$-SAD between the chrominance U/V of the target block and the chrominance $U_1'$~$U_n'/V_1'$~$V_n'$ of the candidate blocks. Next, a minimum one among the luminance differences $Y_1$-SAD~$Y_n$-SAD and minimum ones among the chrominance differences $U_1$-SAD~$U_n$-SAD, $V_1$-SAD~$V_n$-SAD are found respectively to further find the luminance motion vector MV-Y and the chrominance motion vectors MV-U, MV-V. Finally, the minimum one among the motion vectors MV-Y MV-U and MV-V is selected as the motion vector. Such a method needs two to three times of the computation than only the luminance is used for motion estimation, and accordingly the computation load and the amount of bandwidth usage are relatively increased. Therefore, it is desirable to provide an improved method and system for motion estimation to mitigate and/or obviate the aforementioned problems.

SUMMARY OF THE INVENTION

The object of the invention is to provide a method and system for motion estimation using chrominance information, which can eliminate serious chromatic aberration.

According to one aspect of the invention, a system for motion estimation using chrominance information is provided, which is based on each block of a current frame to find a corresponding block from a previous frame and accordingly determines a motion vector. The system includes a luminance difference computation unit, a first chrominance difference computation unit, a second chrominance difference computation unit, a chrominance distortion detection unit and a difference comparison unit. The luminance difference computation unit computes luminance differences between a luminance of a target block in a current frame and luminance of candidate blocks in a previous frame. The first chrominance difference computation unit computes first chrominance differences between a first chrominance of the target block in the current frame and first chrominance of the candidate blocks in the previous frame. The second chrominance difference computation unit computes second chrominance differences between a second chrominance of the target block in the current frame and second chrominance of the candidate blocks in the previous frame. The chrominance distortion detection unit is based on the first chrominance differences and the second chrominance differences to adjust the luminance differences and to accordingly output adjusted luminance differences. The difference comparison unit finds a minimum one among the adjusted luminance differences and accordingly determines the motion vector.

Accordingly to another aspect of the invention, a method for motion estimation using chrominance information is provided, which is based on each block of a current frame to find a corresponding block from a previous frame and accordingly determines a motion vector. The method includes: (A) computing luminance differences between a luminance of a target block in a current frame and luminance of candidate blocks in a previous frame; (B) computing first chrominance differences between a first chrominance of the target block in the current frame and first chrominance of the candidate blocks in the previous frame; (C) computing second chrominance differences between a second chrominance of the target block in the current frame and second chrominance of the candidate blocks in the previous frame; (D) adjusting the luminance differences based on the first chrominance differences and the second chrominance differences and outputting adjusted luminance differences; and (E) finding a minimum one among the adjusted luminance differences and accordingly determining the motion vector.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
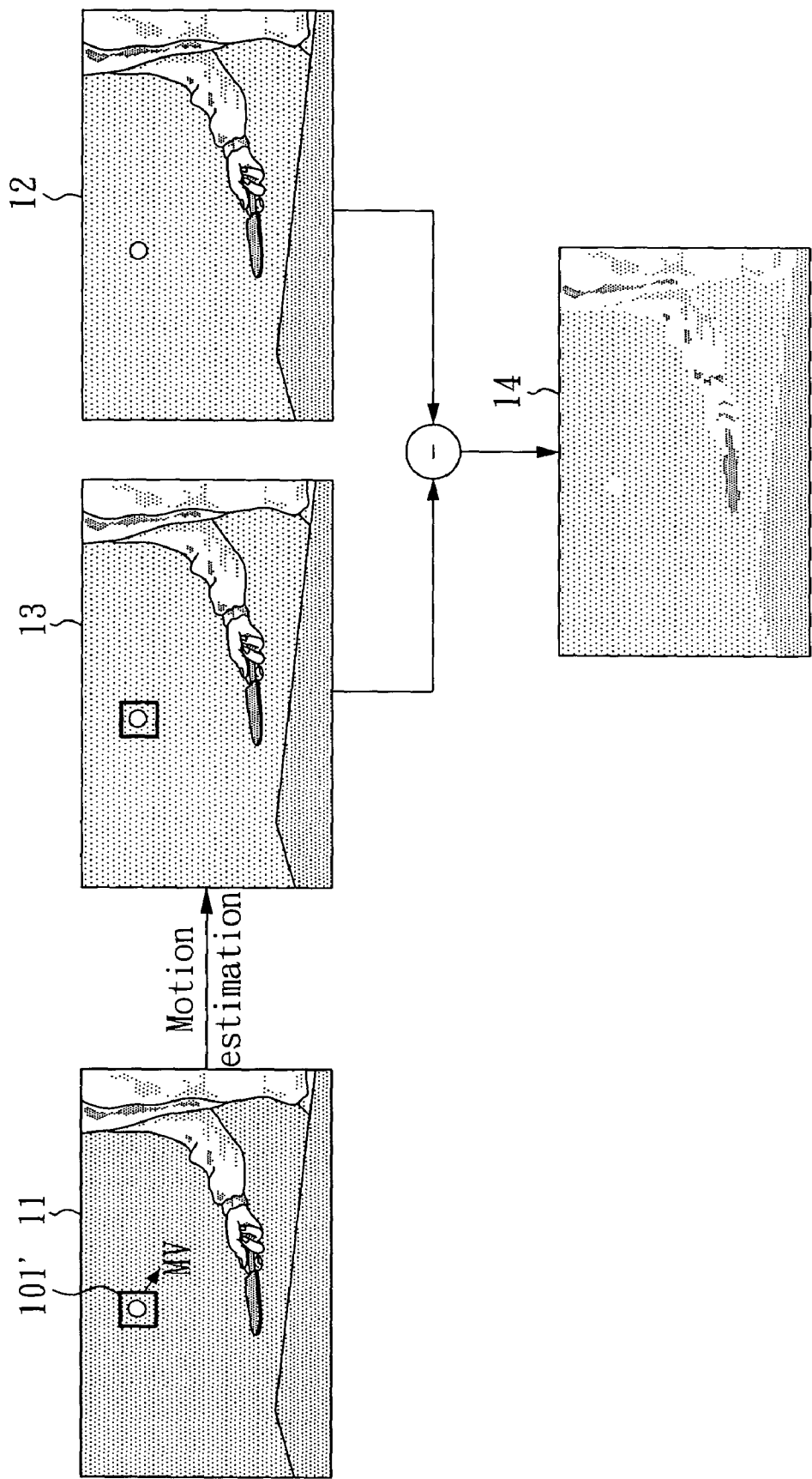
FIG. 1 shows a flowchart of a typical inter-frame coding.
Figure 2:
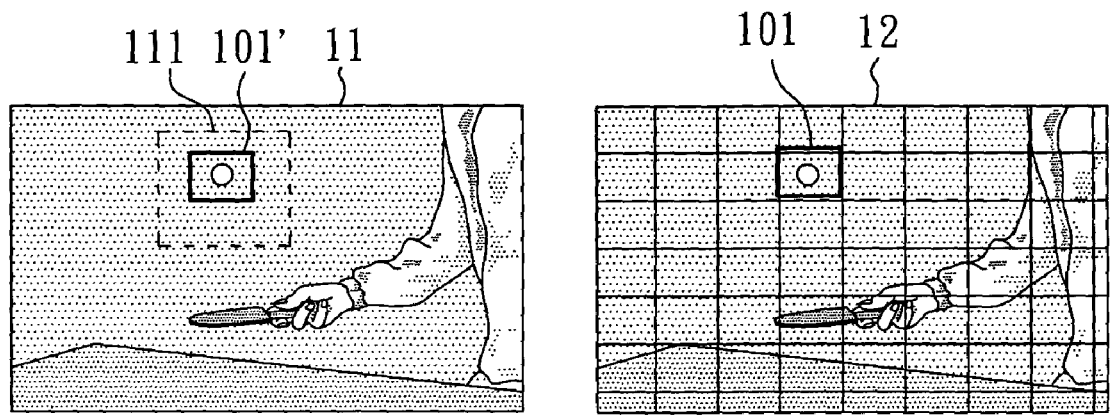
FIG. 2 shows a flowchart of a typical motion estimation.
Figure 3:
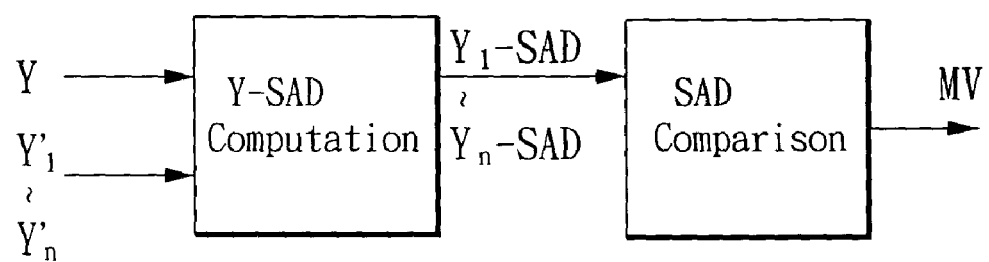
FIG. 3 shows a schematic diagram of an example of a typical motion estimation using luminance.
Figure 4:
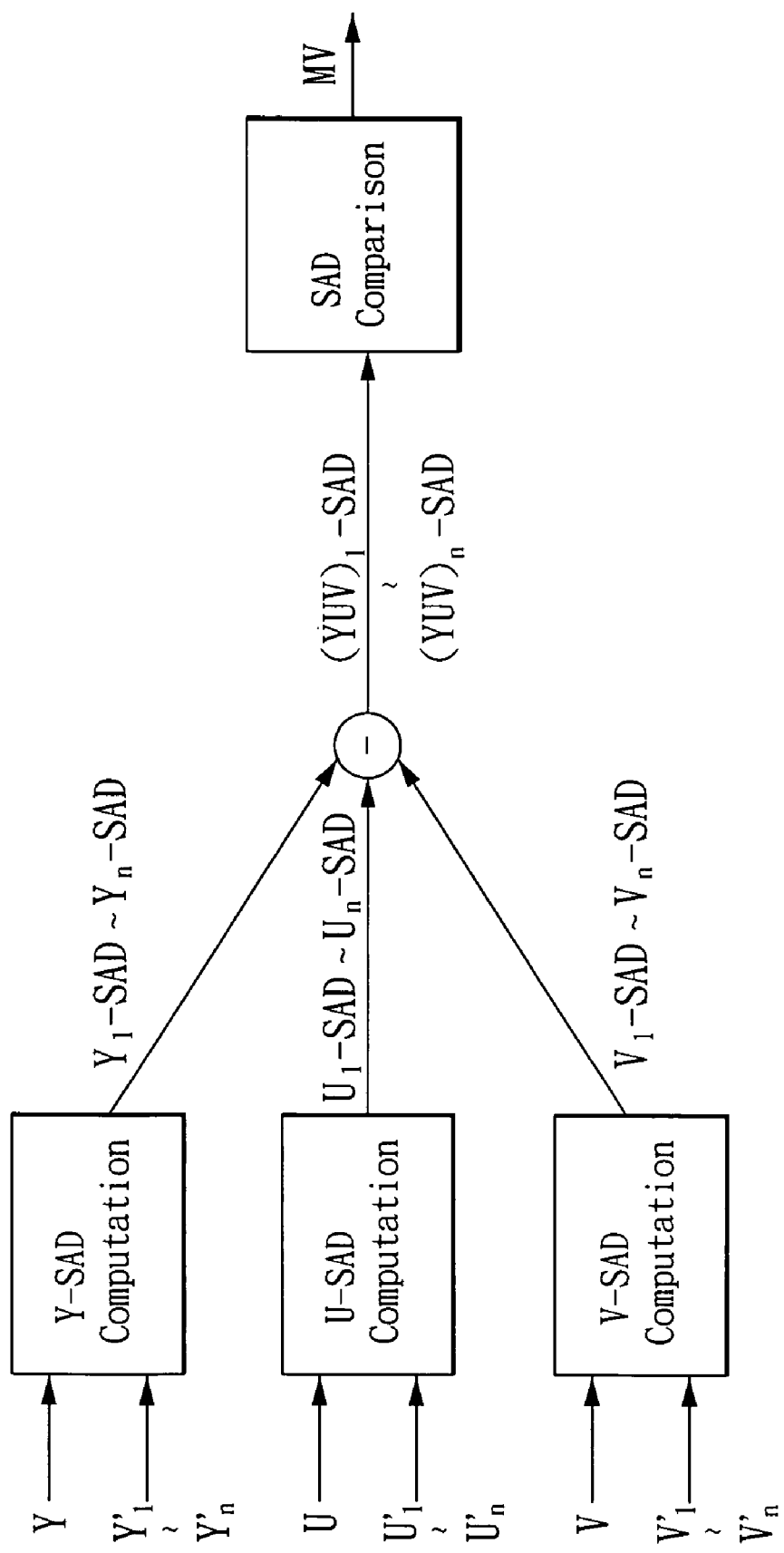
FIG. 4 shows a schematic diagram of another example of a typical motion estimation using luminance.
Figure 5:
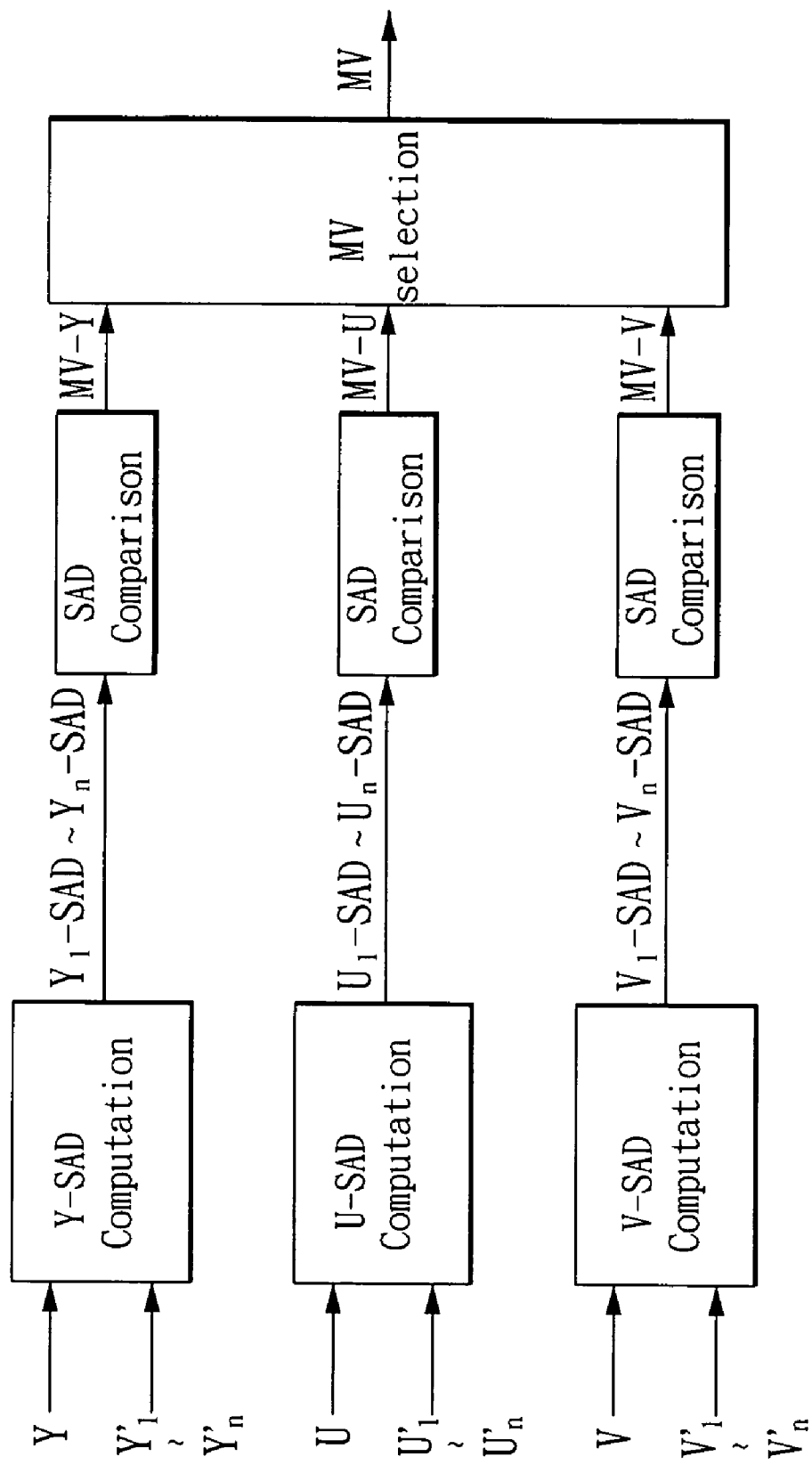
FIG. 5 shows a schematic diagram of a further example of a typical motion estimation using luminance.
Figure 6:
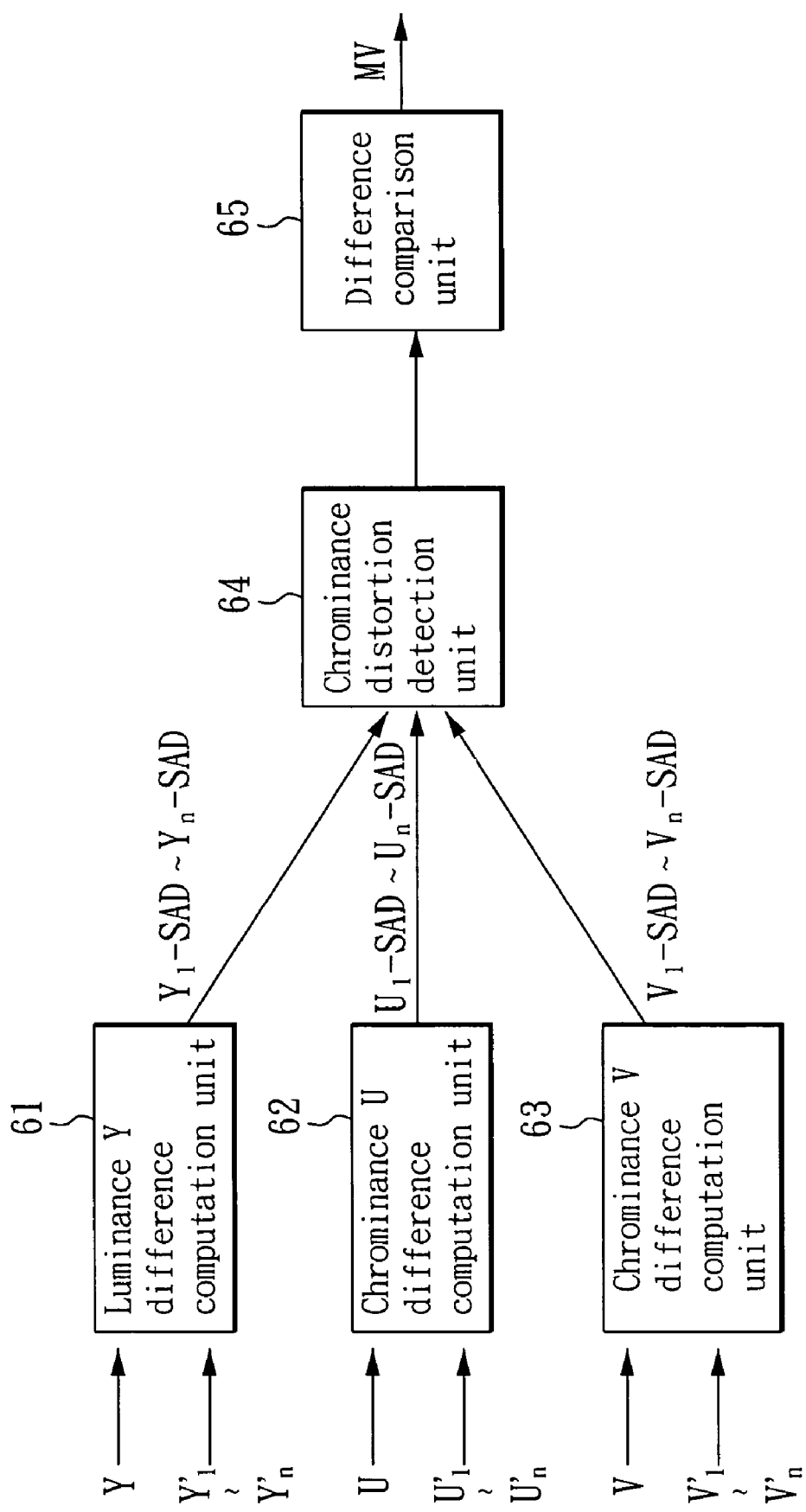
FIG. 6 shows a block diagram of a system for motion estimation using chrominance information according to the invention.

FIG. 6 shows a block diagram of a system for motion estimation using chrominance information according to the invention. As shown in FIG. 6, the system includes a luminance Y difference computation unit 61, a chrominance U difference computation unit 62, a chrominance V difference computation unit 63, a chrominance distortion detection unit 64 and a difference comparison unit 65. The luminance Y difference computation unit 61 computes luminance differences $Y_1$-SAD~$Y_n$-SAD between the luminance Y of a target block in a current frame and luminance $Y_1'$~$Y_n'$ of candidate blocks a previous frame. The chrominance U difference computation unit 62 computes chrominance differences $U_1$-SAD~$U_n$-SAD between a chrominance U of the target block in the current frame and chrominance $U_1'$~$U_n'$ of the candidate blocks in the previous frame. The chrominance V difference computation unit 63 computes chrominance differences $V_1$-SAD~$V_n$-SAD between a chrominance V of the target block in the current frame and chrominance $V_1'$~$V_n'$ of the candidate blocks in the previous frame.

Figure 7:
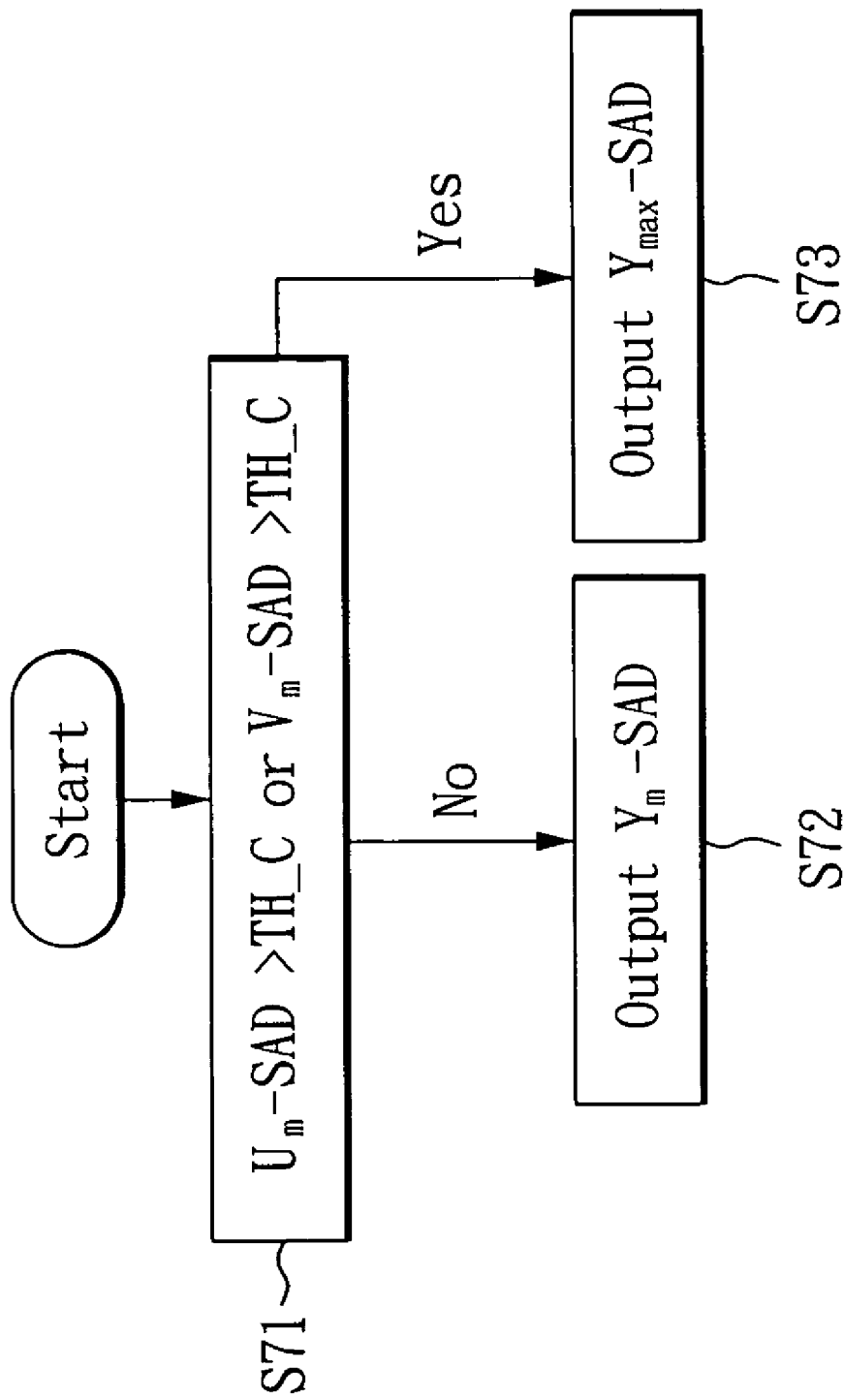
FIG. 7 shows a flowchart of an operation of a chrominance distortion detection unit according to the invention.

The chrominance distortion detection unit 64 is based on the chrominance differences $U_1$-SAD~$U_n$-SAD and $V_1$-SAD~$V_n$-SAD computed to adjust the luminance differences $Y_1$-SAD~$Y_n$-SAD and to accordingly output adjusted luminance differences. FIG. 7 shows a flowchart of an operation of the chrominance distortion detection unit 64. As shown in FIG. 7, each chrominance U difference $U_m$-SAD and its corresponding chrominance V difference $V_m$-SAD are compared with a predetermined chrominance threshold TH_C (step S71). If none of the chrominance U difference $U_m$-SAD and the chrominance V difference $V_m$-SAD is greater than the threshold TH_C, it indicates a low chromatic change, and a luminance Y difference $Y_m$-SAD corresponding to the chrominance differences $U_m$-SAD and $V_m$-SAD is directly output, i.e., $Y_{out}$-SAD=$Y_m$-SAD (step S72). If either the chrominance U difference $U_m$-SAD or the chrominance V difference $V_m$-SAD is greater than the threshold TH_C, it indicates a high chromatic change and potentially causes an error. In this case, to overcome the error, the luminance Y difference $Y_m$-SAD is adjusted to a maximum luminance Y difference for output, i.e., $Y_{out}$-SAD=$Y_{max}$-SAD (step S73). Thus, such a block corresponding to the maximum luminance Y difference can be pre-excluded.

At this point, when the difference comparison unit 65 is based on the luminance difference $Y_{out}$-SAD output by the unit 64 to find the minimum one for accordingly determining the motion vector, the block which has the potential to cause error is set to a maximum luminance Y difference value, and the luminance Y difference with the maximum luminance Y difference is not selected by the unit 65 and has no influence on the motion vector determined.

Figure 8:
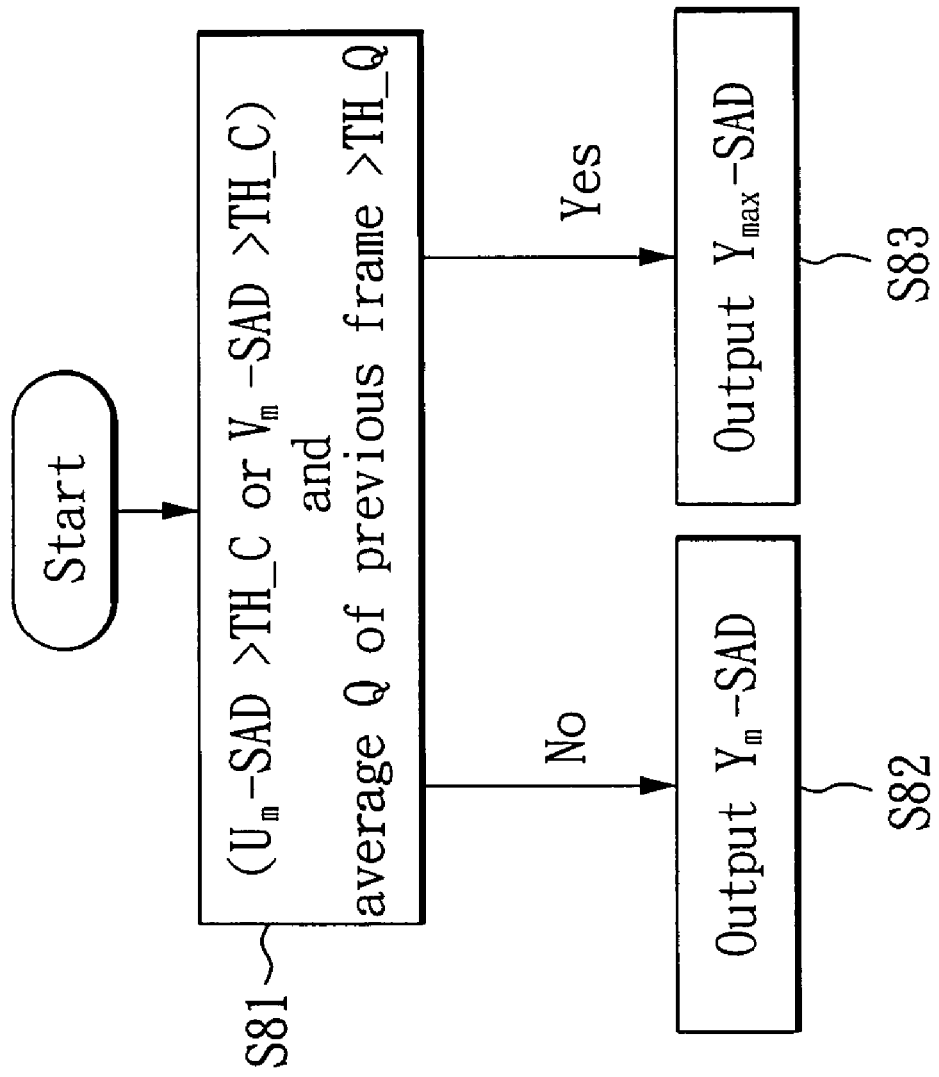
FIG. 8 shows a flowchart of another operation of a chrominance distortion detection unit according to the invention.

FIG. 8 shows a flowchart of another operation of a chrominance distortion detection unit according to the invention. As compared to FIG. 7, the difference is in step S81 of FIG. 8, which compares an average Q of the previous frame with a predetermined quantization threshold TH_Q in addition to comparing the chrominance U and V differences $U_m$-SAD and $V_m$-SAD with the threshold TH_C, wherein the Q is a quantization step-size for indicating a compression factor, which is known to those persons skilled in the art of MPEG technology. If none of the chrominance U difference $U_m$-SAD and the chrominance V difference $V_m$-SAD is greater than the threshold TH_C or the average Q is not greater than the quantization threshold TH_Q, it indicates a low chromatic change or a low compression factor, and a luminance Y difference $Y_m$-SAD corresponding to the chrominance differences $U_m$-SAD and $V_m$-SAD is directly output, i.e., $Y_{out}$-SAD=$Y_m$-SAD (step S82). If either the chrominance U difference $U_m$-SAD or the chrominance V difference $V_m$-SAD is greater than the threshold TH_C and the average Q is greater than the quantization threshold TH_Q, it indicates a high chromatic change and potentially causes an error and a high compression factor, thus the luminance Y difference $Y_m$-SAD is adjusted to a maximum luminance Y difference for output, i.e., $Y_{out}$-SAD=$Y_{max}$-SAD (step S83). Thus, such a block corresponding to the maximum luminance Y difference can be pre-excluded.

As cited, the invention uses a simple and effective processing and determining mechanism to add chrominance differences to thus select appropriate luminance differences and to pre-exclude blocks with low luminance differences and high chrominance differences. Accordingly, the serious chromatic aberration of a frame on motion compensation is eliminated, under the condition of high quantization factor.

Although the present invention has been explained in relation to its preferred embodiment, it is to be understood that many other possible modifications and variations can be made without departing from the spirit and scope of the invention as hereinafter claimed.

What is claimed is:

1. A system for motion estimation using chrominance information, which is based on each block of a current frame to find a corresponding block from a previous frame and accordingly determines a motion vector, the system comprising:
   a luminance difference computation unit, which computes luminance differences between a luminance of a target block in the current frame and luminance of candidate blocks in the previous frame;
   a first chrominance difference computation unit, which computes first chrominance differences between a first chrominance of the target block in the current frame and first chrominance of the candidate blocks in the previous frame;

a second chrominance difference computation unit, which computes second chrominance differences between a second chrominance of the target block in the current frame and second chrominance of the candidate blocks in the previous frame;

a chrominance distortion detection unit, which is based on the first chrominance differences and the second chrominance differences to adjust the luminance differences and to accordingly output adjusted luminance differences; and a difference comparison unit, which finds a minimum one among the adjusted luminance differences and accordingly determines the motion vector.

2. The system as claimed in claim 1, wherein when a first chrominance difference or a second chrominance difference is greater than a predetermined chrominance threshold, the chrominance distortion detection unit adjusts a luminance difference corresponding to the first chrominance difference or the second chrominance difference into a maximum luminance difference to output; and conversely, the luminance difference is directly output.

3. The system as claimed in claim 1, wherein when a first chrominance difference or a second chrominance difference is greater than a predetermined chrominance threshold and an average Q of the previous frame is greater than a predetermined quantization threshold, the chrominance distortion detection unit adjusts a luminance difference corresponding to the first chrominance difference or the second chrominance difference into a maximum luminance difference to output; otherwise, the luminance difference is directly output.

4. The system as claimed in claim 1, wherein the first chrominance corresponds to chrominance U and the second chrominance corresponds to chrominance V.

5. The system as claimed in claim 1, wherein the blocks of current frame and previous frame are macroblocks.

6. The system as claimed in claim 1, wherein the blocks of current frame and previous frame are subblocks of macroblocks.

7. A method for motion estimation using chrominance information, which is based on each block of a current frame to find a corresponding block from a previous frame and accordingly determines a motion vector, the method comprising the steps:

(A) computing luminance differences between a luminance of a target block in the current frame and luminance of candidate blocks in a search range of the previous frame;

(B) computing first chrominance differences between a first chrominance of the target block in the current frame and first chrominance of the candidate blocks in the previous frame;

(C) computing second chrominance differences between a second chrominance of the target block in the current frame and second chrominance of the candidate blocks in the previous frame;

(D) adjusting the luminance differences based on the first chrominance differences and the second chrominance differences and outputting adjusted luminance differences; and (E) finding a minimum one among the adjusted luminance differences and accordingly determining the motion vector.

8. The method as claimed in claim 7, wherein in step (D), when a first chrominance difference or a second chrominance difference is greater than a predetermined chrominance threshold, a luminance difference corresponding to the first chrominance difference or the second chrominance difference is adjusted into a maximum luminance difference to output; otherwise, the luminance difference is directly output.

9. The method as claimed in claim 7, wherein in step (D), when a first chrominance difference or a second chrominance difference is greater than a predetermined chrominance threshold and an average Q of the previous frame is greater than a predetermined quantization threshold, a luminance difference corresponding to the first chrominance difference or the second chrominance difference is adjusted into a maximum luminance difference to output; otherwise, the luminance difference is directly output.

10. The method as claimed in claim 7, wherein the first chrominance corresponds to chrominance U and the second chrominance corresponds to chrominance V.

11. The method as claimed in claim 7, wherein the blocks of current frame and previous frame are macroblocks.

12. The method as claimed in claim 7, wherein the blocks of current frame and previous frame are subblocks of macroblocks.

* * * * *